(12) United States Patent
Opitz

(10) Patent No.: US 6,382,113 B2
(45) Date of Patent: May 7, 2002

(54) DEVICE FOR TRANSPLANTING TREES OR BUSHES

(76) Inventor: Dieter Opitz, Waldhausstr. 8, D-91180 Heideck (DE)

( * ) Notice: Subject to any disclaimer, the term of this patent is extended or adjusted under 35 U.S.C. 154(b) by 0 days.

(21) Appl. No.: 09/757,009

(22) Filed: Jan. 8, 2001

(30) Foreign Application Priority Data

Jan. 13, 2000 (DE) .......................................... 100 01 078

(51) Int. Cl.⁷ .............................................. A01G 23/02
(52) U.S. Cl. ......................................... 111/101; 37/302
(58) Field of Search ................................. 111/100, 101; 37/301, 302, 187; 294/88, 68.23; 414/625; 405/232, 231, 246, 247

(56) References Cited

U.S. PATENT DOCUMENTS

| | | | | |
|---|---|---|---|---|
| 3,558,177 A | * | 1/1971 | Snead | 111/101 |
| 3,736,882 A | * | 6/1973 | Stephenson | 111/102 |
| 4,045,891 A | * | 9/1977 | Grew | 37/302 |
| 5,772,363 A | * | 6/1998 | Larson | 405/232 |
| 5,842,427 A | * | 12/1998 | Hunter et al. | 111/101 |

FOREIGN PATENT DOCUMENTS

| | | |
|---|---|---|
| DE | 29 02 597 | 7/1980 |
| DE | 30 08 009 | 9/1981 |
| DE | 31 09 727 | 10/1982 |
| DE | 39 43 053 | 7/1991 |

\* cited by examiner

*Primary Examiner*—Robert E. Pezzuto
(74) *Attorney, Agent, or Firm*—Collard & Roe, P.C.

(57) ABSTRACT

A device for transplanting trees or bushes having at least two spades that can be adjusted against each other. These spades can be set between an open and closed position by means of a pair of attached servo-drives. When in the open position, the spades are removed from each other by a space corresponding at least with a diameter of the tree or the bush to be transplanted. When the spades are in their closed position, they complement each other, forming a partial spherical cup. To reduce the resistance of the spades as they penetrate the soil, the cutting blade of the spade has the shape of a corrugated ground edging. These corrugated ground edges have alternating elevations and recesses, whereby the elevations of the cutting blade provide sufficient stability and safety against breakage. The ground surfaces that oppose each other on these spades are disposed on alternating sides to allow the cutting blades to overlap.

29 Claims, 1 Drawing Sheet

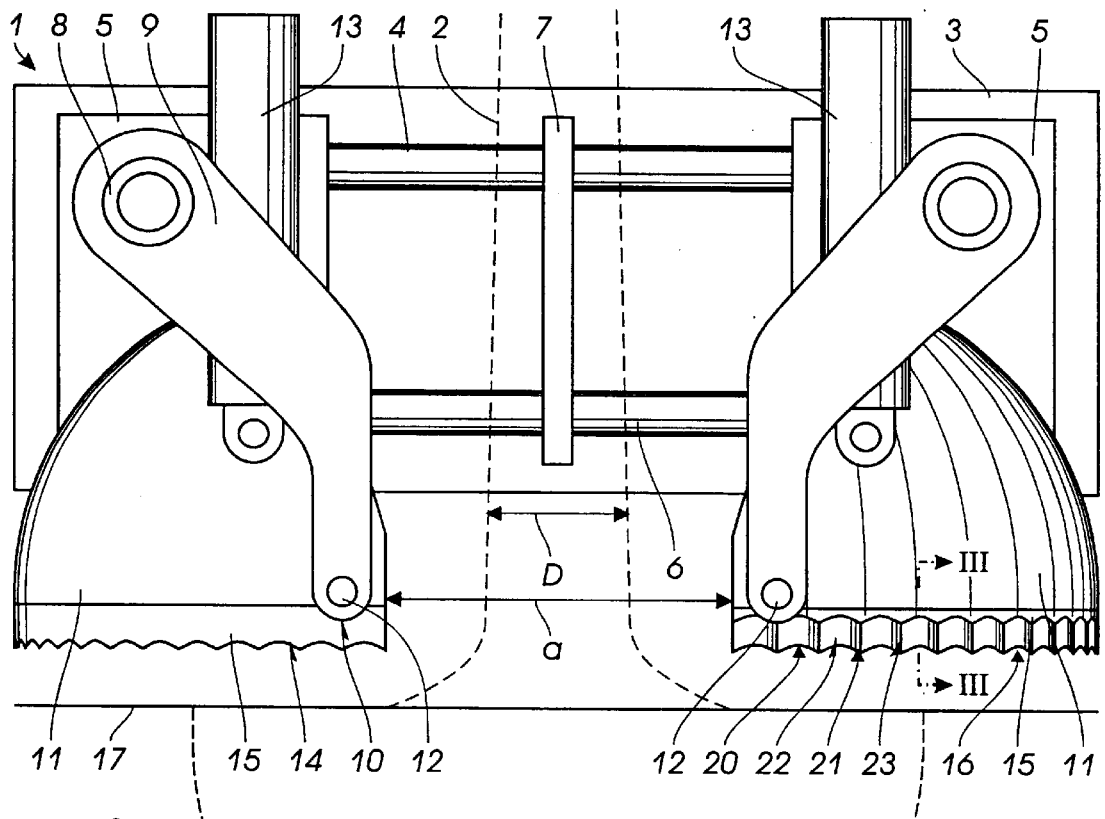
*Fig. 1*
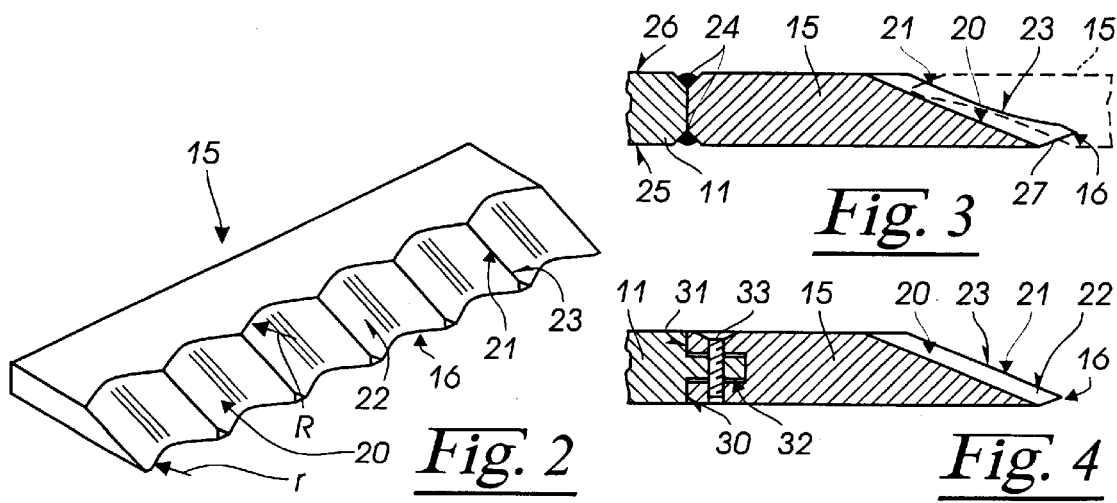
*Fig. 2*
*Fig. 3*
*Fig. 4*

DEVICE FOR TRANSPLANTING TREES OR BUSHES

BACKGROUND OF THE INVENTION

1. Field of the Invention

The invention relates to a device for transplanting trees or bushes. The device contains a series of digging spades having corrugated edges.

2. Prior Art

A device for transplanting trees is known from German Patent 31 09 727 A1 that comprises two digging spades in the shape of one quarter sphere. These digging spades can be displaced and pivoted against each other, whereby they complement one another in a closed position, forming a semispherical cup. The edge surfaces of these digging spades, are directed downwards in an open starting position. These edges have a zigzag shape, so that these digging spades have a row of teeth. These teeth have ground surfaces whose outer edges are shaped into cutting blades. The cutting blades help the digging spades penetrate into the ground especially when severing the roots of the tree to be transplanted. While this device has been successfully used in practical applications, it was found that there is a need for further improvements. In particular, it was found that the teeth may break off if they are pressed against stones embedded in the soil.

A single-ball undercutting and lifting device is known from German Patent 39 43 053 A1. This device is substantially formed by two slim blades, which are pivotally-mounted, and swing about a common axle. These cutting blades have ground or finished surfaces shaped in a sinusoidal manner.

A device for digging out plants is known from German Patent 30 08 009 A1. This device has spades with cutting blades that are smooth in front. These spades can be pivoted against each other and partially overlap one another in a closed position. The smooth cutting blades are exposed to the risk of becoming blunt and getting bent by the stones embedded in the soil.

SUMMARY OF THE INVENTION

Therefore, the invention provides a device capable of cutting through the roots when a tree or shrub is lifted out, while the design of this device requires fewer repairs.

The device of the invention has two spades that can be adjusted against each other for digging and transplanting trees or bushes. These open spades are spaced apart from each other by at least the diameter of a tree trunk. Thus these spades can be moved past the trunk of the tree into a position where they embrace the tree or bush to be transplanted. The spades have cutting blades that are directed downwards when opened. Furthermore, these spades are actively connected with a servo-drive, or hydraulic drive, which adjusts and swivels the spades in relation to each other.

In this adjustment process, the spades are first set so that the cutting blades complement each other to form a substantially circular shape embracing the tree or bush to be transplanted on all sides.

The spades are pivoted in relation to each other about an axis approximately extending through a common center point, so that they penetrate the soil surrounding the tree to be transplanted. Two or more spades can be used, however, the individual spades should substantially complement each other in a closed position to form a semi-spherical cup. Because of the special form of the spades, their surfaces always extend in the zone of the cut produced by the cutting blades. This design assures that the spades can be driven through the soil with relatively little use of force.

However, often when trees or bushes are transplanted, the spades are pressed against rocks embedded in the soil. To reduce the damage to the spades caused by rocks, the cutting blades have edges that are ground in a corrugated manner. The corrugated edges have alternating elevations and concave recesses, so that the cutting blade, as viewed in the cross section, has acute angles. With this design the cutting blade has sufficient stability when the soil is penetrated because of the elevations. These edges could also have a chamfer or rounding without impairing the function of the corrugated ground edges. These corrugated ground edges of the cutting blade are only corrugated to a minor extent.

Thus, while cutting blades are normally susceptible to fracture, the projecting sections are disposed in an area of material thickenings to reduce the rate of fracture. The cutting blade can consequently be highly stressed, while the soil nonetheless exerts only minor resistance to the blade. Therefore, this spade is far tougher than previous designs and provides an easy penetration of the soil.

In another embodiment of the invention, the spades have cutting blades disposed on either side. When only two spades are used, the cutting blade is disposed on the inside of one of the spades, and on the outside of the other spade. However, if the number of spades is increased, it is necessary to provide approximately half of these spades with cutting blades located on the inside face, and the other half with cutting blades located on the outside face. The transition between two cutting blades is disposed on the lower points of the spades. In the closed position, the ground surfaces of the cutting blades partially overlap one another so that the ground surfaces of the spades come to rest against each other. Thus the cutting blades can correctly sever the thicker roots such as the tap root of the tree to be replaced, especially when these roots are located in where the cutting blades meet in their closed position.

To further reduce the risk of breaking the cutting blade, the elevations of the corrugated, ground edging should be capped on their end sides. This will further reduce the waviness of the contour of the cutting blade, so that the protruding parts of the ground surface are formed substantially parallel with the contour of the cutting blade. The contour of the cutting blade has no projecting corners exposed to any increased risk of fracture. The blade contour, formed by the counter edges, is thus acutely angular as viewed in the direction of movement of the spades, so that the thicker roots can be easily severed.

Furthermore, the elevations of the cutting blades should be offset in relation to each other. In this way, the elevations of one cutting blade engage the recesses of the opposite cutting blade, so that the blades will not mutually obstruct each other. The two cutting blades can be extensively overlapped when the spades are in the closed position, so that downward extending roots of the tree can be reliably severed.

If the spacing between the elevations of the corrugated, ground edges of the cutting blades is too large in relation to the thickness of the spade, the cutting blade will no longer have the required stability within the zone of the recesses. Thus, this blade may be damaged by rocks embedded in the soil. However, if the spacing between the elevations is too small, these elevations will offer excessive resistance to the soil as the spade penetrates the soil. With a spade thickness of about 10 mm, a spacing of between 15 and 60 mm between the elevations was found to be successful, whereby a spacing of about 30 mm is preferred.

In one embodiment, the cutting blade basically could be joined with the spade as one single piece. However, in a second embodiment, the cutting blade should have a separate edge that is retained on the spade. This separate edge has a greater hardness than the spade, so that the blade has a particularly long life. This spade also has sufficient elasticity, so that it is capable of giving way to any rocks embedded in the soil, without excessively stressing the cutting blade. To fix the separate edge on the spade, the spades and the separate edge should be welded to each other. Thus, the joint between the separate edge and the spade can be highly stressed, with no fastening means projecting beyond the spade on the inner or outer sides. This protruding fastening means would have the drawback of exerting additional resistance to the spade as the spade penetrates the soil, and consequently would be subjected to increased stress as well.

The separate edge could be placed on the face of the spade in a butt-jointed manner. However, it is better if the surface of the cutting blade is tapered in the form of steps, and the end of the spade is shaped to conform to this stepped tapering. The separate edge is preferably retained on the spade by means of a tongue and groove profile capable of absorbing lateral forces. The pressure forces exerted on the separate edge are directly absorbed by the face of the spade, so that there is no need for an additional holding means. These holding means therefore could be used in a weaker form and thus in a space-saving manner, so that no components protrude beyond the spade. For example, the separate edge could be retained on the spade by spot-welded points or countersunk screws.

If the separate edge is joined with the spade by detachable holding means, the replacement of these separate edges is simplified when the cutting blade shows too much wear. Countersunk screws that do not project beyond the spade are preferably used as a holding means.

Finally, in another improvement of the invention a plurality of parts is provided with cutting blades and are retained on the spade, so that only the segment that was damaged during use need be replaced. This reduces the costs for maintaining the device.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

In the drawing wherein similar reference characters denote similar elements throughout the several views:

FIG. 1 shows a front view of a device for transplanting trees or bushes;

FIG. 2 is a spatial view of an alternative embodiment of the cutting blade of the device according to FIG. 1;

FIG. 3 is a cross-sectional view showing a section through a spade of the device according to FIG. 1 taken along line III—III of FIG. 1 of the cutting blade of FIG. 2; and FIG. 4 is a cross-sectional view of another alternative embodiment.

DETAILED DESCRIPTION OF THE PREFERRED EMBODIMENT

Referring in detail to the drawings, FIG. 1 shows a device 1 for transplanting trees or bushes 2 having a frame 3. A guide 4 is retained in frame 3, and two sliding carriages 5 are displaceably retained on guide 4, sliding along guide 4. Sliding carriages 5 are displaceable by means of servo-drives 6 in the form of hydraulic cylinders. These hydraulic cylinders 6 are supported on a central holding means 7 of frame 3, and are controlled so that the two sliding carriages can be driven toward or away from each other.

A support tube 8 is retained on each of the sliding carriages 5, and an angle 9 is connected with support tube 8 with torsional strength. A spade 11 is articulated on end 10 of spade 11 opposing support tube 8. Spade 11 has the shape of a partial spherical cup, whereby spade 11 embraces about one eighth of a full spherical cup. To swivel spade 11 about a swivel bearing 12 of angle 9, spade 11 is engaged by a servo-drive 13 that is supported pivotally on sliding carriage 5. Servo-drive 13 is shaped in the form of a hydraulic cylinder.

A separate edge 15 is retained on free end 14 of spade 11. This free end is directed downwards in the free position shown in FIG. 1, and has a cutting blade 16. Separate edge 15 is joined with spade 11 by welding and has a greater hardness than spade 11. Spade 11 shown on the left side in FIG. 1, has a cutting blade 16 on its inner side, and spade 11 shown on the right has cutting blade 16 shown on its outer side.

Cutting blade 16 has recesses 20, which are rounded in a concave form, and wherein elevations 21 are located between recesses 20. Recess 20 has a concave, cylindrical limiting surface 22, whereby elevations 21 have straight edges 23. This special embodiment of cutting blade 16 which is in the form of a corrugated ground edging, causes spade 11 to have low resistance in soil 17 and high stability when cutting trees.

The method for transplanting trees 2 or bushes with the help of device 1 according to FIG. 1 is explained in the following. First, the sliding carriages 5 and the spades 11 are driven with the help of servo-drives 6, and 13 into the open position shown in FIG. 1, whereby spades 11 are removed from each other by a spacing "a". This spacing at least corresponds with the diameter "D" of the trunk of tree or bush 2. Subsequently, device 1, which is preferably mounted on an excavator, a loader or a bobcat, is maneuvered so that tree or bush 2, is located in the center between spades 11. This situation is shown in FIG. 1.

Thereafter, spades 11 are now displaced against each other by actuating servo-drives 6 until the spacing "a" approaches zero. In this position, cutting blades 16 of spades 11 complement each other to form a substantially closed circle, with tree or bush 2 being located in the center of this circle. By actuating the hydraulics of the excavator, device 1 is now lowered to an extent such that spades 11 penetrate soil 17 by about 10 cm. This penetration is facilitated by designing free ends 14 of spades 11 in the form of cutting blades 16, so that the excavator only has to exert a relatively low force of pressure on device 1. This is particularly important in cases in which spades 11 have to sever roots of tree 2.

Spades 11 are now pivoted about swivel bearings 12 by actuating servo-drives 13. Cutting blades 16 of spades 11 will now penetrate the soil deeper and produce a substantially semi-spherically shaped cut 18. Spades 11 have a partly spherical shape, whereby their spherical center point is located on the pivot axis of swivel bearing 12. This assures that the spade will follow a section line 18 created by cutting blades 16 in soil 17 as it is performing its pivoting motion. Spades 11 therefore do not exert any lateral pressure or tensile forces on soil 17, which helps spades 11 penetrate into soil 17.

When spades 11 are in their final position, cutting blades 16 partially overlap one another, to sever the roots of tree or bush 2. When spades 11 are in their final position, tree or bush 2 is completely detached from soil 17, and it can then be removed by lifting device 1 by means of the excavator together with the surrounding, approximately semispherically shaped root bale.

Thereafter, tree or bush 2, is transported with device 1 to a location where it is to be planted, where a corresponding planting pit has already been dug. Spades 11 are lowered into this planting pit by lowering device 1, whereupon spades 11 are pivoted away from each other by actuating servo-drives 13. Device 1 is subsequently lifted by the excavator, and sliding carriages 5 are driven apart by actuating servo-drives 6, so that spades 11 can be pulled away on both sides of tree or bush 2. This completes the transplanting of tree or bush 2.

FIG. 2 shows a spatial representation of an alternative embodiment of separate edge 15 with cutting blade 16. Separate edge 15 is made of hardened steel, which extends the useful life of cutting blade 16.

Separate edge 15 consists of an elongated strip with a substantially trapezoidal cross section, whereby only a small cutout of this strip is shown in FIG. 2. Separate edge 15 is bent in the form of a circle with the radius of spade 11 for adapting it to spade 11 (not shown in FIG. 2). Spade 11 has concave-shaped, rounded recesses 20 on a slanted side of the trapezoidal cross section of separate edge 15 and elevations 21 are located between these recesses. Recess 20 has a concave conical limiting surface 22 whose inner radius "R" is greater than the outer radius "r" on the side of the cutting blade. Elevations 21 each contain curved edges 23. Because cutting blade 16 is in the form of a special corrugated, ground edging, even less resistance is encountered by spade 11 in soil 17 as compared to the embodiment according to FIG. 1. In addition, elevations 21 provide sufficient stability for cutting blade 16.

FIG. 3 shows a view of a section through spade 11 with separate edge 15. Both elements are joined with each other by welding seams 24, whereby welding seams 24 terminate substantially flush to inner surface 25 and outer surface 26 of spade 11. This prevents welding seams 24 from exerting increased resistance on spade 11 as it is penetrating soil 17.

Furthermore, separate edge 15 of opposite spade 11 is indicated in FIG. 3 by a dashed line, whereby spades 11 are located in their closed position. Cutting blades 16 may partially overlap each other, both on the outer and inner side of spades 11. To assure as much overlapping of cutting blades 16 as possible, elevations 21 of cutting blades 16 are offset with respect to each other, so that elevation 21 of one spade 11 approximately engages recess 20 of the other spade 11.

Finally, FIG. 4 shows another alternative way of fastening separate edge 15 on spade 11. The abutting surfaces 30, and 31 of separate edge 15 and spade 11 are designed in a step-like manner, whereby those abutting surfaces 30 and 31 have a tongue and groove profile 32. This tongue and groove profile 32 provides sufficient support for separate edge 15 on spade 11 against lateral forces, so that the holding means for securing separate edge 15 only needs to satisfy relatively low requirements. In particular, this holding means has to be capable of withstanding only low tensile forces. In this embodiment of FIG. 4, a countersunk screw is used as holding means 33, so that the connection between spade 11 and separate edge 15 defines a detachable joint. Thus, any damaged screws 16 can be easily replaced, so that the device is reusable after only a short repair time.

As opposed to FIG. 3, cutting blade 16 according to FIG. 4 has a series of recesses 20, which have cylindrical limiting surfaces 22. These surfaces create straight edges inside straight edges 23 which are set at the same angle as recesses 20.

Accordingly, while only a few embodiments of the present invention have been shown and described, it is obvious that many changes and modifications may be made thereunto without departing from the spirit and scope of the invention.

What is claimed is:

1. A device for transplanting trees or bushes comprising:
   a) at least two spades being adjustable against each other and being driveable into an open position in which said at least two spades are spaced apart from each other by at least a diameter of a tree trunk or bush;
   b) at least two cutting blades wherein at least one of said at least two cutting blades is disposed on each of said at least two spades, wherein each of said at least two cutting blades has a ground surface having alternating corrugated ground recesses formed by a series of concave conical limiting surfaces and adjacent elevations forming edges; and
   c) at least one servo drive connected to said at least two spades for driving said at least two spades together or apart wherein said at least two spades are designed to substantially compliment each other when said at least two spades are driven together.

2. The device as in claim 1, wherein said ground surfaces are disposed either on an inside edge surface of said at least two spades or on an outside edge surface of said at least two spades.

3. The device as in claim 1, wherein said cutting blade elevations have a counter ground edging disposed on their sides.

4. The device as in claim 1, wherein said cutting blade elevations on a pair of opposite facing spades are disposed offset from each other.

5. The device as in claim 1, wherein said cutting blade elevations are spaced apart from each other at a distance of 15 mm to 60 mm.

6. The device as in claim 1, wherein said spacing of said cutting blade elevations is 30 mm.

7. The device as in claim 1, further comprising at least two separate edges each of which having at least one of said cutting blades, wherein at least one of said at least two separate edges is coupled to each of said at least two spades and said at least two separate edges have a greater hardness than that of said at least two spades.

8. The device as in claim 7, wherein said separate edge is welded to said face side of each of said at least two spades.

9. The device as in claim 7, further comprising a holding means for connecting said separate edge to each of said at least two spades.

10. The device as in claim 7, wherein said separate edge has a surface that is formed in a step-like manner, and each of said at least two spades have a surface that is shaped complimentary to said surface on said separate edge.

11. The device as in claim 7 wherein said separate edge is formed so that a plurality of said separate edges can be coupled to each of said at least two spades.

12. A device for transplanting trees or bushes comprising:
   a) at least two spades being adjustable against each other and being driveable into an open position in which said at least two spades are spaced apart from each other by at least a diameter of a tree trunk or bush;

b) at least two cutting blades wherein at least one of said at least two cutting blades is disposed on each of said at least two spades, wherein each of said at least two cutting blades has a ground surface having alternating corrugated ground recesses formed by a series of concave cylindrical limiting surfaces and adjacent elevations forming edges; and c) at least one servo drive connected to said at least two spades for driving said at least two spades together or apart wherein said at least two spades are designed to substantially compliment each other when said at least two spades are driven together.

13. The device as in claim 12, wherein said ground surfaces are disposed either on an inside edge surface of said at least two spades or on an outside edge surface of said at least two spades.

14. The device as in claim 12, wherein said cutting blade elevations have a counter ground edging disposed on their sides.

15. The device as in claim 12, wherein said cutting blade elevations on a pair of opposite facing spades are disposed offset from each other.

16. The device as in claim 12, wherein said cutting blade elevations are spaced apart from each other at a distance of 15 mm to 60 mm.

17. The device as in claim 12, wherein said spacing of said cutting blade elevations is 30 mm.

18. The device as in claim 12, further comprising at least two separate edges each of which having at least one of said cutting blades, wherein at least one of said at least two separate edges is coupled to each of said at least two spades and said at least two separate edges have a greater hardness than that of said at least two spades.

19. The device as in claim 18, wherein said separate edge is welded to said face side of each of said at least two spades.

20. The device as in claim 18, further comprising a holding means for connecting said separate edge to each of said at least two spades.

21. The device as in claim 18, wherein said separate edge has a surface that is formed in a step-like manner, and each of said at least two spades have a surface that is shaped complimentary to said surface on said separate edge.

22. The device as in claim 18 wherein said separate edge is formed so that a plurality of said separate edges can be coupled to each of said at least two spades.

23. A device for transplanting trees or bushes comprising:

a) at least two spades being adjustable against each other and being driveable into an open position in which said at least two spades are spaced apart from each other by at least a diameter of a tree trunk or bush;

b) at least two cutting blades wherein at least one of said at least two cutting blades is disposed on each of said at least two spades, wherein each of said at least two cutting blades has a ground surface wherein said ground surfaces are disposed either on an inside edge surface of said at least two spades or on an outside edge surface of said at least two spades; and c) at least one servo drive connected to said at least two spades for driving said at least two spades together or apart wherein said at least two spades are designed to substantially compliment each other when said at least two spades are driven together.

24. The device as in claim 23, wherein said spacing of said cutting blade elevations is 30 mm.

25. The device as in claim 24, further comprising at least two separate edges each of which having at least one of said cutting blades, wherein at least one of said at least two separate edges is coupled to each of said at least two spades and said at least two separate edges have a greater hardness than that of said at least two spades.

26. The device as in claim 24, wherein said separate edge is welded to said face side of each of said at least two spades.

27. The device as in claim 24, further comprising a holding means for connecting said separate edge to each of said at least two spades.

28. The device as in claim 24, wherein said separate edge has a surface that is formed in a step-like manner, and each of said at least two spades have a surface that is shaped complimentary to said surface on said separate edge.

29. The device as in claim 24 wherein said separate edge is formed so that a plurality of said separate edges can be coupled to each of said at least two spades.

* * * * *